(12) United States Patent
Oh

(10) Patent No.: US 10,871,114 B1
(45) Date of Patent: Dec. 22, 2020

(54) ACTIVE PURGE SYSTEM AND ACTIVE PURGE METHOD

(71) Applicants: Hyundai Motor Company, Seoul (KR); Kia Motors Corporation, Seoul (KR)

(72) Inventor: Young-Kyu Oh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/700,106

(22) Filed: Dec. 2, 2019

(30) Foreign Application Priority Data

Jun. 3, 2019 (KR) ........................ 10-2019-0065228

(51) Int. Cl.
| | |
|---|---|
| F02D 41/04 | (2006.01) |
| F02D 41/00 | (2006.01) |
| F02M 25/08 | (2006.01) |
| F02M 35/10 | (2006.01) |
| B60K 15/035 | (2006.01) |
| F02D 13/02 | (2006.01) |

(52) U.S. Cl.
CPC .... *F02D 41/0032* (2013.01); *B60K 15/03504* (2013.01); *F02D 13/0207* (2013.01); *F02D 41/0042* (2013.01); *F02D 41/0045* (2013.01); *F02M 25/089* (2013.01); *F02M 25/0836* (2013.01); *F02M 35/10222* (2013.01); *F02M 35/10386* (2013.01); *B60K 2015/03514* (2013.01); *F02D 2200/04* (2013.01); *F02D 2200/0614* (2013.01); *F02D 2200/101* (2013.01); *F02D 2200/1002* (2013.01)

(58) Field of Classification Search
CPC ............. F02D 41/0032; F02D 41/0042; F02D 41/0045; F02D 2200/101; F02D 2200/0614; F02D 2200/04; F02D 2200/1002; F02D 13/0207; F02M 35/10222; F02M 35/10386; F02M 25/089; F02M 25/0836; B60K 2015/03514; B60K 2015/03504
USPC ... 123/48 B, 78 E, 78 F, 345, 346, 347, 348, 123/516, 518, 519, 520, 90.15
See application file for complete search history.

(56) References Cited

FOREIGN PATENT DOCUMENTS

| KR | 20040023161 A | 3/2004 |
|---|---|---|
| KR | 20080044529 A | 5/2008 |
| KR | 20090104498 A | 10/2009 |
| KR | 20130063819 A | 6/2013 |
| KR | 20150043155 A | 4/2015 |

*Primary Examiner* — Hai H Huynh
(74) *Attorney, Agent, or Firm* — Mintz Levin Cohn Ferris Glovsky and Popeo, P.C.; Peter F. Corless

(57) ABSTRACT

An active purge system includes a canister in which a vaporized gas produced in an fuel tank is collected and a purge line that connects the canister to an intake pipe. A purge pump is mounted in the purge line, a purge valve is mounted in the purge line to be positioned between the purge pump and the intake pipe, and a cylinder is connected to the intake pipe. A valve controller changes the operation timing, operation maintenance time, and the operation degree of an intake valve and an exhaust valve disposed at the upper portion of the cylinder. A compression ratio variation device is mounted on a connecting rod and a crankshaft that are connected to a piston to change the top dead center or the bottom dead center of the piston reciprocating in the cylinder.

19 Claims, 4 Drawing Sheets

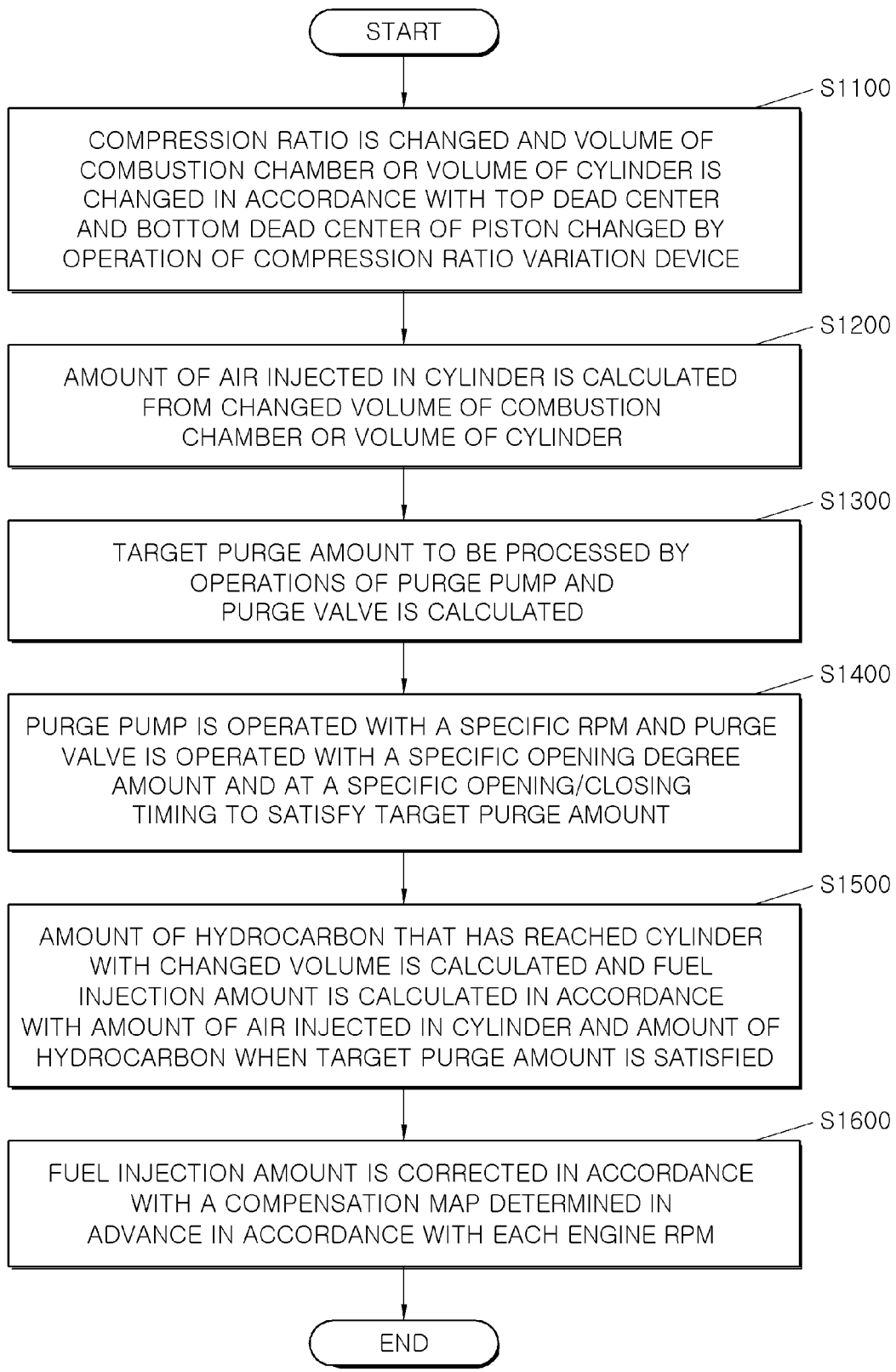

ACTIVE PURGE SYSTEM AND ACTIVE PURGE METHOD

CROSS-REFERENCE TO RELATED APPLICATIONS

This application claims priority to Korean Patent Application No. 10-2019-0065228, filed on Jun. 3, 2019, which is incorporated herein by reference in its entirety.

BACKGROUND

Field of the Disclosure

The present disclosure relates to an active purge system and an active purge method and, more particularly, to an active purge system and an active purge method that prevent production of dense combustion and unburned gas, even if a vaporized gas is processed simultaneously with changing in a compression ratio during driving.

Description of Related Art

When an engine maintains specific revolutions per minute (RPM), as the load applied to the engine increases, the energy efficiency increases. As the vehicle is being driven, the RPM of an engine and load applied to the engine changes due to changes in inclination of a road and speed. A technology of variable compression ratio (VCR) capable of increasing energy efficiency of an engine by increasing a compression ratio in a low-medium load range under an appropriate level has been studied.

The VCR technology is applied to an engine through a structure in which a link structure is installed between a connecting rod and a crankshaft and an actuator connected to the link structure is operated to move the rotational center of the link structure and change the top dead center and the bottom dead center of a piston. When the top dead center of a piston center is maximum, the compression ratio is maximum, and when the top dead center of the piston is minimum, the compression ratio is minimum. In a low-medium load range, the compression ratio is made maximum, and in a high-rotation and high-load range, the compression ratio is made minimum to prevent knocking of an engine.

Meanwhile, the compression ratio may be changed by operating an intake valve. It may be possible to reduce the compression ratio that is actually applied to an engine by reducing the amount of air that is compressed by delaying closing of an intake valve during the compression stroke. Particularly, the amount of the air that is compressed in the compression stroke decreases, but the same volume is maintained in the explosion or expansion stroke as that in the intake stroke, and thus, Atkinson cycle in which an engine is operated with a large expansion ratio in comparison to the compression ratio is simulated. In an engine that simulates Atkinson cycle through operation of an intake valve, a pumping loss decreases, and thus, the energy efficiency increases.

A technology capable of changing the opening/closing timing of a valve, the degree of opening of the valve, and the opening-maintenance time of the valve, that is, valve control technologies so-called continuously variable valve timing (CVVT), continuously variable valve lift (CVVL), continuously variable valve duration (CVVD), etc. are applied to engines manufactured to implement a 4-stroke Otto cycle, thereby being able to achieve Atkinson cycle.

However, a vaporized gas is produced in a fuel tank, based on the atmospheric pressure and a temperature change. When the vaporized gas is excessively produced in a fuel tank, the fuel tank may be broken or may malfunction or the vaporized gas may leak out of the fuel tank to the atmosphere. The vaporized gas should thus be appropriately removed from the fuel tank to prevent damage to the fuel tank or leakage of the vaporized gas to the atmosphere.

A purge line is installed between a fuel tank and an intake manifold and a vaporized gas is moved from the fuel tank to the intake manifold by negative pressure applied to the purge line by engine-pumping pressure. However, when a turbocharger is applied to an engine, the pressure of the intake manifold is equal to or greater than the atmospheric pressure, and thus, load is not generated in the purge line and intake air may move to the purge line from the intake manifold.

Further, as described above, when the VCR technology or the valve control technology is applied to an engine, the compression ratio is changed and the operation of valves is changed, and thus, the amount of intake air flowing into the combustion chamber would be changed and the amount of fuel that is sprayed from a combustion chamber would be changed. Accordingly, when the vaporized gas reaches the combustion chamber through the purge line, dense combustion occurs and unburned gas may exist in the exhaust gas.

SUMMARY

The present disclosure provides an active purge system and an active purge method that prevent dense combustion and exhaust of unburned gas even if a compression ratio is changed, an intake/exhaust is operated, and a vaporized gas is processed during operation of a turbocharger.

In order to achieve the above-described object, according to an exemplary embodiment of the present disclosure, an active purge system may include: a canister in which a vaporized gas produced in an fuel tank is collected; a purge line that connects the canister to an intake pipe; a purge pump mounted in the purge line; a purge valve mounted in the purge line to be positioned between the purge pump and the intake pipe; a cylinder connected to the intake pipe; a valve controller configured to adjust the operation timing, operation maintenance time, and the operation degree of an intake valve and an exhaust valve disposed at the upper portion of the cylinder; and a compression ratio variation device mounted on a connecting rod and a crankshaft that are connected to a piston to change the top dead center or the bottom dead center of the piston reciprocating in the cylinder.

A first pressure sensor may be disposed in the purge line to be positioned between the purge pump and the purge valve, a second pressure sensor may be disposed in the purge line to be positioned between the canister and the purge pump, and RPM of the purge pump, and the opening amount and the opening timing of the purge valve may be changed based on signals generated by the first pressure sensor and the second pressure sensor.

The valve controller may be configured to induce a compression ratio to be less than an expansion ratio by delaying the closing timing of the intake valve during a compression stroke. The compression ratio variation device may be configured to increase the compression ratio by maximizing the top dead center of the piston when the engine is in operation in a low-medium load range, and may be configured to decrease the compression ratio by minimizing the top dead center of the piston when the engine RPM is in a high-speed range.

In order to achieve the above-described object, according to an exemplary embodiment of the present disclosure, an active purge method may include: calculating the amount of air injected in the cylinder before fuel injection; calculating a target purge amount to be processed by operation of the purge pump and the purge valve; operating the purge pump with a specific RPM and the purge valve with a specific opening degree amount and at a specific opening/closing timing to satisfy the target purge amount; and calculating the amount of hydrocarbon that has reached the cylinder when the target purge amount is satisfied and calculating a fuel injection amount based on the amount of air injected in the cylinder and the amount of hydrocarbon.

The amount of air injected in the cylinder may be calculated from a signal generated from a sensor mounted on an intake manifold. The signal may be substituted to a pre-prepared intake amount map to derive the amount of air. The amount of air injected in the cylinder may be primarily calculated from the volume of the combustion chamber and volume of the cylinder changed based on the top dead center and the bottom dead center of the piston changed by the operation of the compression ratio variation device, and the primarily calculated amount of air may be secondarily calculated by compensating for the primarily calculated amount of air based on the change in the opening degree amount of the throttle valve.

The amount of air injected in the cylinder may be calculated by compensating for the secondarily calculated amount of air based on the amount of air estimated to flow into the cylinder and the move to the intake manifold by operation of the valve controller during the compression stroke. The amount of air injected in the cylinder may be calculated by compensating for the secondarily calculated amount of air based on the amount of circulation gas estimated to circulate to the intake pipe when the exhaust gas recirculation (EGR) valve operates.

The amount of air injected in the cylinder may be calculated by compensating for the secondarily calculated amount of air based on an oversupply amount estimated to be oversupplied by operation of a compressor mounted on the intake pipe. The amount of air injected in the cylinder may be calculated by compensating for the secondarily calculated amount of air based on the amount of vaporized gas estimated to be injected into the intake pipe by operations of the purge pump and the purge valve.

The compression ratio variation device may be configured to change the compression ratio by changing the top dead center or the bottom dead center of the piston in accordance with engine RPM and a torque map. The active purge method may further include correcting the fuel injection amount based on a compensation map determined in advance for each engine RPM.

Atmospheric temperature, cooling water temperature, the amount of oxygen contained in exhaust gas, the amount of hydrocarbon, and the fuel injection amount may be stored as learning data; the atmospheric temperature, the cooling water temperature, the amount of oxygen contained in exhaust gas, and the amount of hydrocarbon that has reached the cylinder that are currently acquired in a driving state may be substituted for the learning data and thus, a fuel injection amount stored in the learning data may be derived. The fuel injection amount corrected based on the compensation map may be corrected based on the fuel injection amount derived from the learning data.

In order the achieve the object, an active purge method according to an exemplary embodiment of the present disclosure may include: changing a compression ratio and changing the volume of the combustion chamber or the volume of the cylinder based on the top dead center and the bottom dead center of the piston changed by operation of the compression ratio variation device; calculating the amount of air injected in the cylinder from the changed volume of the combustion chamber or the volume of the cylinder; calculating a target purge amount to be processed by operations of the purge pump and the purge valve; operating the purge pump with a specific RPM and the purge valve with a specific opening degree amount and at a specific opening/closing timing to satisfy the target purge amount.

Further, the active purge method may further include calculating the amount of hydrocarbon that has reached the cylinder with the changed volume, calculating a fuel injection amount based on the amount of air injected in the cylinder and the amount of hydrocarbon, and correcting the fuel injection amount based on a compensation map determined in advance for each engine RPM when the target purge amount is satisfied.

The amount of air injected in the cylinder may be compensated based on the amount of air estimated to flow into the cylinder and the move to the intake manifold by operation of the valve controller during the compression stroke, or may be compensated based on an oversupply amount estimated to be oversupplied by operation of the compressor mounted on the intake pipe. The compression ratio variation device may be configured to change the compression ratio by changing the top dead center or the bottom dead center of the piston based on engine RPM and a torque map.

According to an active purge system and an active purge method of an exemplary embodiment of the present disclosure having the configuration described above, even if the compression ratio is changed, the intake/exhaust may be controlled, and a vaporized gas may be processed while the turbocharger is operated, the fuel injection amount may be adjusted based on the changed amount of intake air and the amount of vaporized gas flowing into the combustion chamber, and thus, dense combustion may be prevented and unburned gas may be prevented from being discharged.

In particular, since the amount of intake air before ignition may be calculated based on the amount of air reaching the combustion chamber, the amount of circulation gas, the amount of hydrocarbon contained in the vaporized gas, etc. by the operations of the compression ratio variation device, the valve controller, the EGR, the turbocharger, and the purge pump, the fuel injection amount is calculated, and then the calculated fuel injection amount is injected, it may be possible to maintain the amount of oxygen contained in the exhaust gas at an appropriate level.

BRIEF DESCRIPTION OF THE DRAWINGS

The above and other objects, features and advantages of the present invention will be more clearly understood from the following detailed description taken in conjunction with the accompanying drawings, in which:

FIGS. 2 to 4 are flowcharts of an active purge method of an exemplary embodiment of the present disclosure.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an active purge system and an active purge method according to an exemplary embodiment of the present disclosure will be described with reference to the accompanying drawings.

Figure 1:
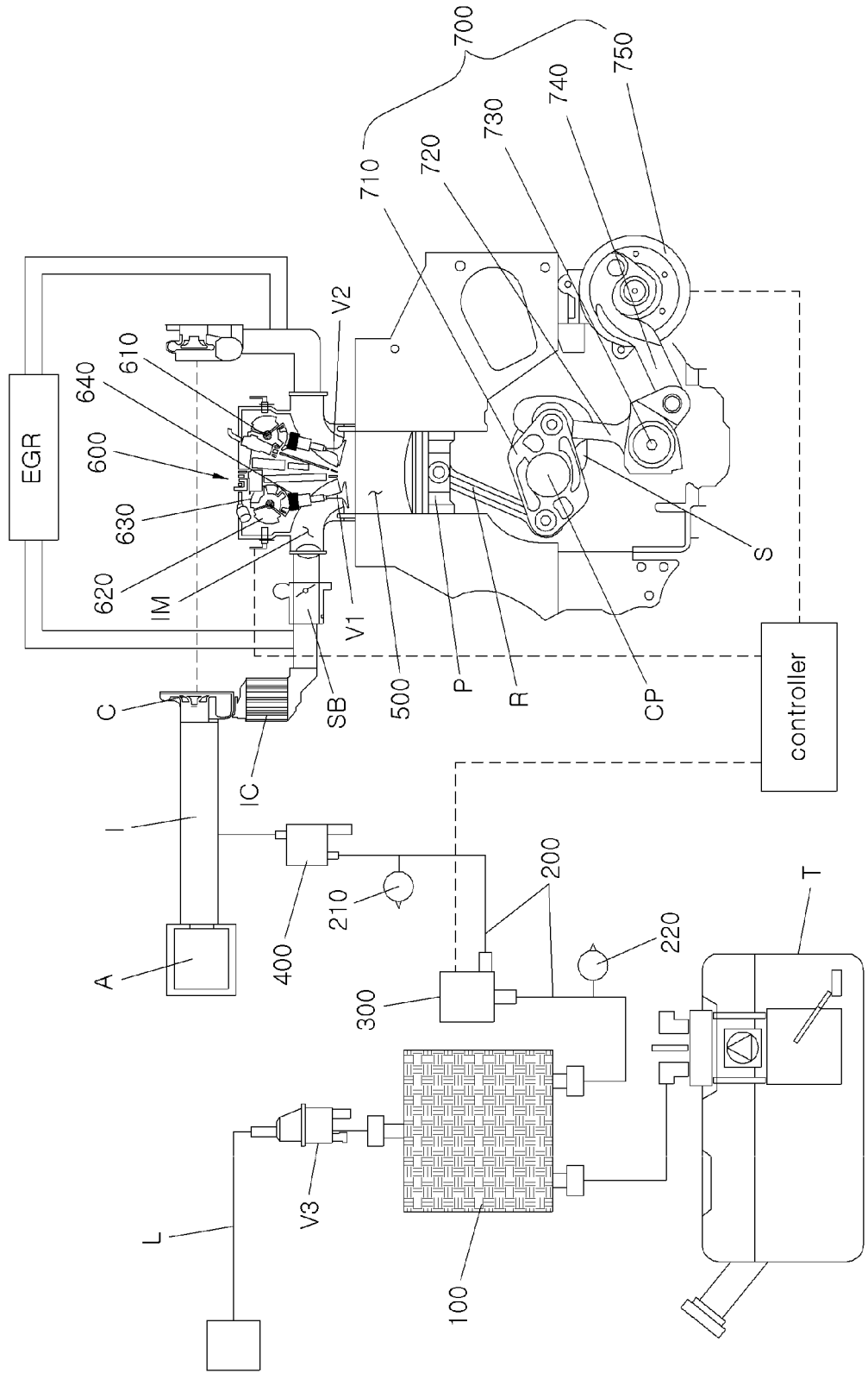
FIG. 1 is a view of an active purge system of an exemplary embodiment of the present disclosure.

As shown in FIG. 1, an active purge system of an exemplary embodiment of the present disclosure may include: a canister 100 in which a vaporized gas produced in an fuel tank T is collected; a purge line 200 that connects the canister 100 to an intake pipe I; a purge pump 300 mounted in the purge line 200; a purge valve 400 mounted in the purge line 200 to be positioned between the purge pump 300 and the intake pipe I; a cylinder 500 connected to the intake pipe I; a valve controller 600 configured to change the operation timing, operation maintenance time, and the operation degree of an intake valve V1 and an exhaust valve V2 disposed at the upper portion of the cylinder 500; and a compression ratio variation device 700 mounted on a connecting rod R and a crankshaft S that are connected to a piston P to change the top dead center and the bottom dead center of the piston P reciprocating in the cylinder.

The canister 100 may be connected to the atmosphere via a line L. A vent valve V3 may be disposed in the line L. The vent valve V3 may block air that flows into the canister 100 from the outside and may discharge air to the outside from the canister 100. The vent valve V3 may include a filter that prevents a vaporized gas from being discharged through the line and a check valve that restricts the flow direction of air.

An air cleaner A may be mounted at an end portion of the intake pipe I. A compressor C configured to operate in combination with a turbocharger mounted on the exhaust pipe may be mounted in the intake pipe I. An intercooler IC may be positioned between the compressor C and an intake manifold IM. A throttle body SB may be positioned between the intercooler IC and an intake manifold IM. A throttle valve, a sensor configured to measure the opening degree amount of the throttle valve, and a sensor configured to measure the pressure and flow rate of intake air moving through the throttle valve may be disposed in a throttle body SB.

The purge pump 300 may be manufactured to be able to maintain the RPM at 60000, 45000, or 30000 per unit time or change RPM. By adjusting the opening/closing amount and the opening/closing timing of the purge valve 400 while adjusting the RPM of the purge pump 300, it may be possible to estimate the concentration and density of vaporized gas concentrated between the purge pump 300 and the purge valve 400 on the purge lines 200. The operation of the purge pump 300 and the purge valve 400 may be adjusted based on information sensed by several sensors, and thus, it may be possible to adjust the amount of vaporized gas flowing to the intake pipe I from the purge line 200 and nonlinearly adjust the flow rate of vaporized gas that is supplied to the intake pipe I from the canister 100.

According to an exemplary embodiment, a first pressure sensor 210 may be disposed in the purge line 200 to be positioned between the purge pump 300 and the purge valve 400, and a second pressure sensor 220 may be disposed in the purge line 200 to be positioned between the canister 100 and the purge pump 300. A target purge flow rate may be determined by the amount of the vaporized gas collected in the canister 100. To satisfy the target purge flow rate, the concentration and density of the vaporized gas concentrated between the purge pump 300 and the purge valve 400 may be adjusted and the opening amount and the opening/closing timing of the purge valve 400 may be adjusted.

The concentration and density of the vaporized gas concentrated between the purge pump 300 and the purge valve 400 may be calculated by comparing a signal generated from the first pressure sensor 210 and a signal generated from the second pressure sensor 220. The amount, density, and concentration of the vaporized gas flowing into the intake pipe I from the purge line 200 may be calculated by the opening amount and the opening/closing timing of the purge valve 400. The RPM of the purge pump 300, the opening amount and the opening timing of the purge valve 400 may be changed based on signals generated by the first pressure sensor 210 and the second pressure sensor 220 to satisfy the target purge flow rate.

The valve controller 600 may be configured to simulate Atkinson cycle by inducing a compression ratio to be less than an expansion ratio by delaying the closing timing of the intake valve V1 during a compression stroke. The valve controller 600 may be configured to change the operation timing, the operation maintenance time, and the operation degree of the intake valve V1 and the exhaust valve V2. The valve controller 600 may include: a shaft 610 positioned on the upper end of the intake valve V1 or the exhaust valve V2; a plurality of cams 620 non-restrictively mounted on the shaft 610; a roller guide 630 mounted on the shaft 610 to be positioned at a side of the cams 620 and change the rotational angle of the cams 620 relative to the rotational angle of the shaft 610; and a roller lift 640 positioned between the intake valve V1 or the exhaust valve V2 and the cams 620 and change the movement distance of the intake valve V1 or the exhaust valve V2 when the intake valve V1 or the exhaust valve V2 are pressed by the cams 620.

The operation of the roller guide 630 may be adjusted by an operation logic, an operation map, etc. prepared in advance. The moment when the cams 620 press the intake valve V1 or the exhaust valve V2 may be adjusted by operation of the roller guide 630. By adjusting the moment when the cams 620 press the intake valve V1 or the exhaust valve V2, CVVT may be implemented. Further, the moment when the intake valve V1 or the exhaust valve V2 are released from the pressurization of the cams 620 may be adjusted by operation of the roller guide 630. By adjusting the moment when the intake valve V1 or the exhaust valve V2 are released from the pressurization of the cams 620, CVVD may be implemented.

The operation of the roller lift 640 may be adjusted through an operation logic, an operation map, etc. prepared in advance. The movement distance of the intake valve V1 or the exhaust valve V2 when the cams 620 press the intake valve V1 or the exhaust valve V2 may be increased by operation of the roller lift 640. The roller lift 640 may include an actuator (not shown). The movement distance of the intake valve V1 or the exhaust valve V2 may be increased by operation of the actuator. The movement distance of the intake valve V1 or the exhaust valve V2 may be adjusted, whereby CVVL may be implemented.

The compression ratio variation device 700 may be configured to change a compression ratio by changing the top dead center or the bottom dead center of the piston P based on engine RPM and a torque map. The compression ratio variation device 700 may include: a link body 710 connected to the connecting rod R at a side and having a center non-restrictively mounted on a crank pin CP; a restriction link 720 connected to the link body 710 at a first side and connected to a control shaft 730 at a second side; an actuator 750 disposed at a side of the control shaft 730; and a control link 740 that connects the actuator 750 and the control shaft 730.

The control shaft 730 may be rotated by operation of the actuator 750, and the maximum height of the top dead center of the piston P may be changed based on a change in height the joint between the link body 710 and the restriction link 720 by rotation of the control shaft 730. The operation of actuator 750 may be adjusted through an operation logic, an operation map, etc. prepared in advance. The compression ratio variation device 700 may be configured to increase the compression ratio by maximizing the top dead center of the piston P when the engine is in operation in a low-medium load range, and decrease the compression ratio by minimizing the top dead center of the piston P when the engine RPM is in a high-speed range.

Figure 2:
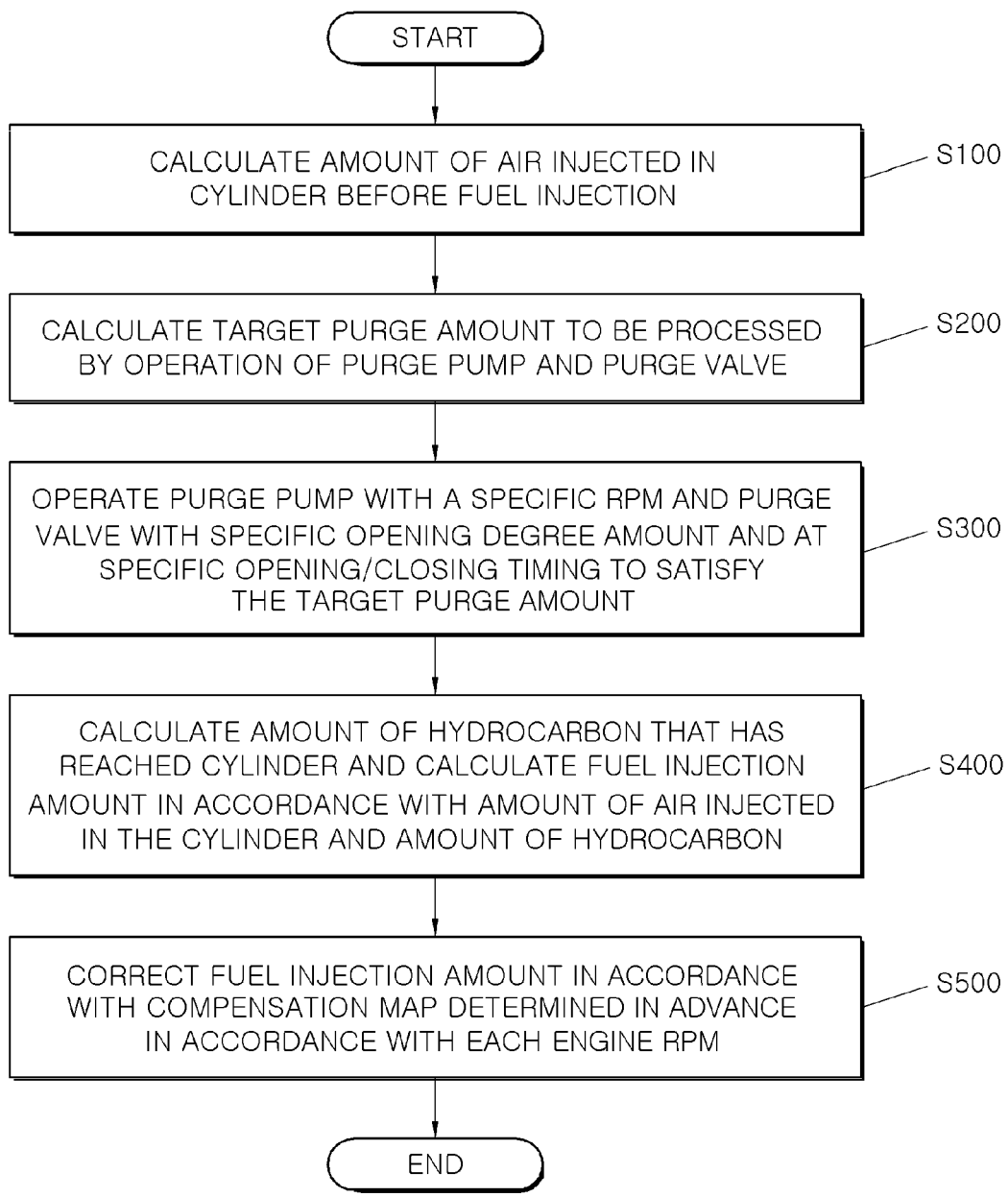
Figure 3:
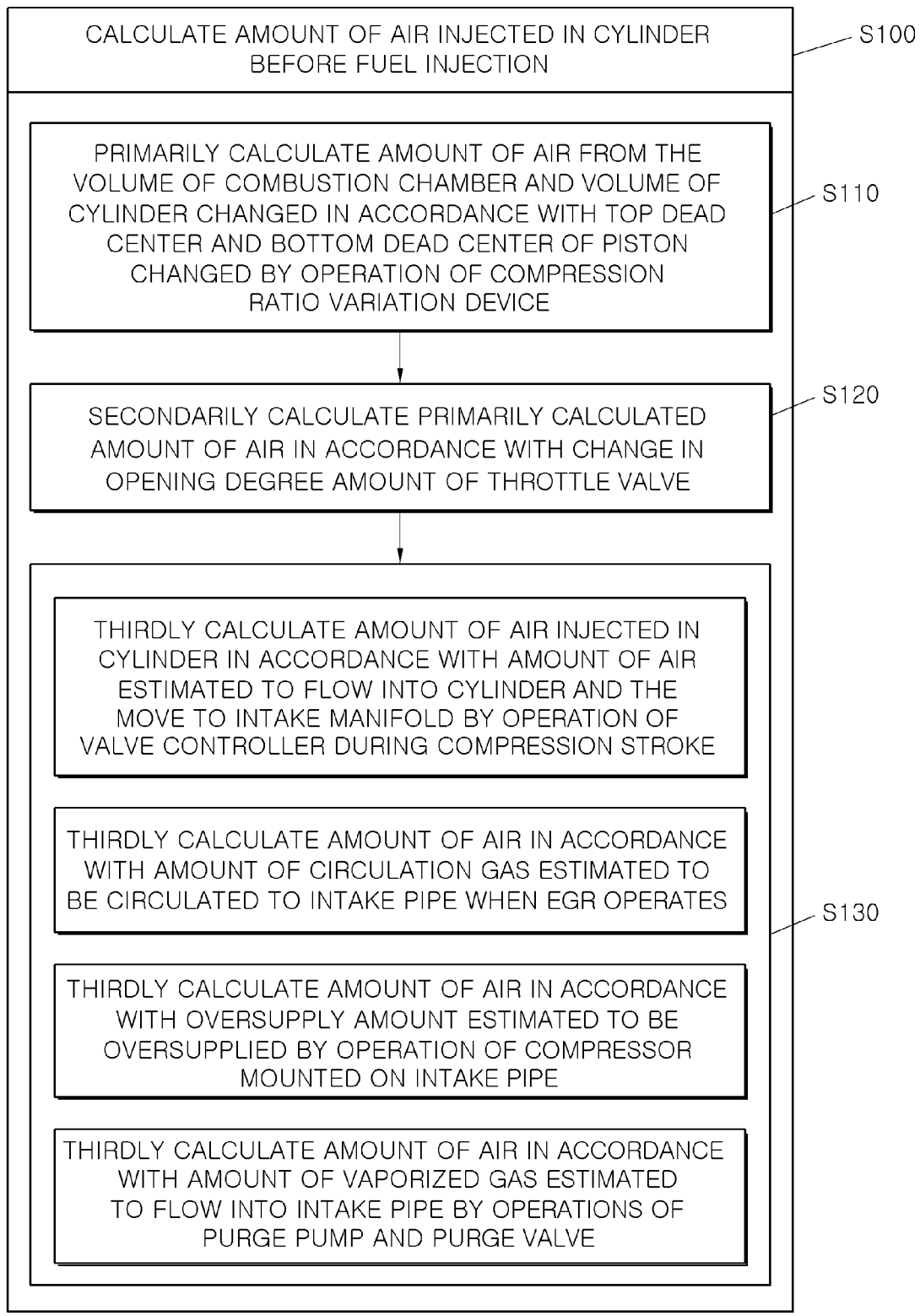

The active purge system according to an exemplary embodiment of the present disclosure having the configuration described above is operated in accordance with the flowcharts shown in FIGS. 2 and 3. As shown in FIGS. 2 and 3, the active purge method according to an exemplary embodiment of the present disclosure may include: calculating the amount of air injected in the cylinder 500 before fuel injection (S100); calculating a target purge amount to be processed by operation of the purge pump 300 and the purge valve 400 (S200); operating the purge pump 300 with a specific RPM and the purge valve 400 with a specific opening degree amount and at a specific opening/closing timing to satisfy the target purge amount (S300); calculating the amount of hydrocarbon that has reached the cylinder 500 and calculating a fuel injection amount based on the amount of air injected in the cylinder 500 and the amount of hydrocarbon (S400); and correcting the fuel injection amount based on a compensation map determined in advance for each engine RPM (S500).

In the calculating of the amount of air injected in the cylinder 500 before fuel injection (S100), the amount of air injected in the cylinder 500 may be calculated from a signal generated from a sensor mounted on an intake manifold IM. According to an exemplary embodiment, the signal may be substituted to a pre-prepared intake amount map. When the signal is substituted to the intake amount map, the amount of air corresponding to the signal may be determined. The intake air map may include a table, a graph, a formula etc. capable of estimating the amount of air injected in the cylinder 500 based on the signal generated from the sensor mounted on the intake manifold IM.

Even though the amount of air may be calculated from the signal generated from the sensor mounted on the intake manifold IM, the amount of the air actually reaching the combustion chamber by operation of the compression ratio variation device 700, operation of the valve controller, operation of the turbocharger, operation of an EGR, and operations of the purge pump 300 and the purge valve 400 may be different from the calculated amount of air. When the difference is substantial (e.g., greater than a predetermined threshold), the amount of fuel injected to the combustion chamber may be excessive or minimal, and when dense or weak combustion is excessively generated, a malfunction such as extinguishment may occur.

In an exemplary embodiment of the present disclosure, the amount of air may be calculated from the signal generated from the sensor mounted on the intake manifold IM and then the amount of air that is expected to actually reach the combustion chamber by operation of the compression ratio variation device 700, operation of the valve controller, operation of the turbocharger, operation of an EGR, and operations of the purge pump 300 and the purge valve 400 may be recalculated.

The amount of air may be primarily calculated from the volume of the combustion chamber and volume of the cylinder 500 changed based on the top dead center and the bottom dead center of the piston P changed by the operation of the compression ratio variation device 700 (S110). In the primarily calculation, the amount of air calculated before by the sensor signal, and the amount of intake air and the intake air pressure derived from the signal generated from the sensor mounted on the intake manifold IM may be used as variables.

Further, the primarily calculated amount of air may be secondarily calculated based on the change in the opening degree amount of the throttle valve (S120). The amount of air flowing into the intake manifold IM may change in real time based on the opening degree amount of the throttle valve. The amount of air is may be calculated by substituting the amount of air primarily calculated by a pre-prepared formula, the opening degree amount of the throttle valve, and the signal generated from the sensor mounted on the intake manifold IM as variables.

The secondarily calculated amount of air may be thirdly calculated based on the driving state of the vehicle (S130). When Atkinson cycle is simulated by the valve controller 600, the amount of air estimated to flow into the cylinder 500 and the move to the intake manifold IM by operation of the valve controller 600 during the compression stroke may be used as a variable in the thirdly calculation of the amount of air. In the pre-prepared formula that is applied in simulation of Atkinson cycle, the amount of air may be thirdly calculated by substituting the secondarily calculated amount of air and the amount of air estimated to move the intake manifold IM during the compression stroke as variables.

During the operation of the EGR, the amount of circulation gas estimated to circulate to the intake pipe I when the EGR operates may be used as a variable for the thirdly calculation of the amount of air. In the pre-prepared formula that is applied when the EGR operates, the amount of air may be thirdly calculated by substituting the secondarily calculated amount of air and the estimated amount of circulation gas as variables.

When oversupply is estimated due to operation of a compressor mounted in the intake pipe I, the oversupply amount by the operation of the compressor may be used as a variable for the thirdly calculation of the amount of air. In the pre-prepared formula that is applied in oversupplying, the amount of air may be thirdly calculated by substituting the secondarily calculated amount of air and the oversupply amount as variables.

When the vaporized gas flows into the intake pipe I by operations of the purge pump 300 and the purge valve 400, the amount of vaporized gas estimated to be injected into the intake pipe I by operations of the purge pump 300 and the purge valve 400 may be used as a variable in the thirdly calculation of the amount of air. In the pre-prepared formula that is applied when the vaporized gas is purged, the amount of air may be thirdly calculated by substituting the secondarily calculated amount of air and the amount of vaporized gas as variables.

When the valve controller 600, the EGR, the turbocharger, the purge pump 300 and the purge valve 400 are operated in a specific combination, in a specific formula prepared to be suitable for the specification combination, the amount of air may be thirdly calculated by substituting two or more of the amount of air estimated to move to the intake manifold IM in the compression stroke, the estimated amount of circulation gas, the oversupplied amount, and the amount of vaporized gas other than the secondarily calculated amount of air as variables.

In the calculating of a target purge amount (S200), the target purge amount of vaporized gas to be purge-processed may be calculated from the amount of vaporized gas adsorbed to the canister 100. When the target purge amount is 0, the operating of the purge pump 300 with a specific RPM and the purge valve 400 with a specific opening degree amount and at a specific opening/closing timing to satisfy the target purge amount (S300) and the following steps may be omitted. Further, the fuel injection amount may be adjusted based on the amount of air thirdly calculated above.

In the operating of the purge pump 300 with a specific RPM and the purge valve 400 with a specific opening degree amount and at a specific opening/closing timing to satisfy the target purge amount (S300), as described above, the concentration and density of the vaporized gas concentrated between the purge pump 300 and the purge valve 400 may be calculated by comparing a signal generated from the first pressure sensor 210 and a signal generated from the second pressure sensor 220. The amount, density, and concentration of the vaporized gas flowing into the intake pipe I from the purge line 200 may be calculated by the opening amount and the opening/closing timing of the purge valve 400. The RPM of the purge pump 300 and the opening amount and the opening timing of the purge valve 400 may be changed based on signals generated by the first pressure sensor 210 and the second pressure sensor 220 to satisfy the target purge flow rate.

After the operating of the purge pump 300 with a specific RPM and the purge valve 400 with a specific opening degree amount and at a specific opening/closing timing to satisfy the target purge amount (S300) is performed, the calculating of a fuel injection amount (S400) may be performed when the target purge amount is satisfied. In the calculating of a fuel injection amount (S400), the amount of hydrocarbon that has reached the cylinder 500 may be calculated and the fuel injection amount may be calculated based on the amount of air injected in the cylinder 500 and the amount of hydrocarbon.

The fuel injection amount may be determined by substituting signals acquired from various sensors during driving, the thirdly calculated amount of air, and the amount of hydrocarbon that has reached the combustion chamber as variables into pre-prepared map, table, and formula. The fuel injection amount may be determined by the amount of hydrocarbon that has reached the combustion chamber, and the thirdly calculated amount of air, and thus, fuel may be prevented from being excessively injected.

In the compensating of the fuel injection amount (S500), the fuel injection amount may be corrected based on a compensation map determined in advance for each engine RPM. The compensation map may be changed by a formula having load generated in the engine and signals acquired through various signals as variables.

As learning data, atmospheric temperature, cooling water temperature, the amount of oxygen contained in exhaust gas, the amount of hydrocarbon, and the fuel injection amount may be stored. The atmospheric temperature, the cooling water temperature, the amount of oxygen contained in exhaust gas, and the amount of hydrocarbon that has reached the cylinder 500 that are currently acquired in a driving state may be substituted for the learning data and the stored fuel injection amount is derived. The fuel injection amount corrected based on the compensation map may be corrected based on the fuel injection amount derived from the learning data. According to an exemplary embodiment, even when the amount of vaporized gas is correspondingly changed with a change in the amount of air suctioned into the combustion chamber based on a change of the compression ratio, it may be possible to prevent generation of dense combustion by adjusting the fuel injection amount.

As shown in FIG. 4, the active purge method according to an exemplary embodiment of the present disclosure may include: changing a compression ratio and changing the volume of the combustion chamber or the volume of the cylinder 500 based on the top dead center and the bottom dead center of the piston P changed by operation of the compression ratio variation device 700 (S1100); calculating the amount of air injected in the cylinder 500 from the changed volume of the combustion chamber or the volume of the cylinder 500 (S1200); calculating a target purge amount to be processed by operation of the purge pump 300 and the purge valve 400 (S1300); operating the purge pump 300 with a specific RPM and the purge valve 400 with a specific opening degree amount and at a specific opening/closing timing to satisfy the target purge amount (S1400); calculating the amount of hydrocarbon that has reached the cylinder 500 with the changed volume and calculating a fuel injection amount based on the amount of air injected in the cylinder 500 and the amount of hydrocarbon when the target purge amount is satisfied (S1500); and correcting the fuel injection amount based on a compensation map determined in advance for each engine RPM (S1600). The method may be notably executed by a controller.

The amount of air injected in the cylinder 500 may be compensated based on the amount of air estimated to flow into the cylinder 500 and the move to the intake manifold IM by operation of the valve controller 600 during the compression stroke, or is compensated based on an oversupply amount estimated to be oversupplied by operation of the compressor mounted on the intake pipe I.

According to an active purge system and an active purge method of an exemplary embodiment of the present disclosure having the configuration described above, even if the compression ratio is changed, the intake and exhaust may be controlled, and the vaporized gas may be processed while the turbocharger is operated, the fuel injection amount may be adjusted based on the changed amount of intake air and the amount of vaporized gas flowing into the combustion chamber, and thus, dense combustion may be prevented and unburned gas may be prevented from being discharged.

In particular, since the amount of intake air right before ignition may be calculated in consideration of the amount of air reaching the combustion chamber, the amount of circulation gas, the amount of hydrocarbon contained in the vaporized gas, etc. by the operations of the compression ratio variation device 700, the valve controller 600, the EGR, the turbocharger, and the purge pump 300, the fuel injection amount may be calculated, and then the calculated fuel injection amount may be injected. Accordingly, it may be possible to maintain the amount of oxygen contained in the exhaust gas at an appropriate level.

What is claimed is:

1. An active purge system, comprising:
   a canister in which a vaporized gas produced in a fuel tank is collected;
   a purge line that connect the canister to an intake pipe;
   a purge pump mounted in the purge line;
   a purge valve mounted in the purge line to be positioned between the purge pump and the intake pipe;
   a cylinder connected to the intake pipe;
   a valve controller configured to change an operation timing, an operation maintenance time, and an operation degree of an intake valve and an exhaust valve disposed at the upper portion of the cylinder; and
   a compression ratio variation device mounted on a connecting rod and a crankshaft connected to a piston to change the top dead center or the bottom dead center of the piston reciprocating in the cylinder.

2. The active purge system of claim 1, wherein a first pressure sensor is disposed in the purge line to be positioned between the purge pump and the purge valve, a second pressure sensor is disposed in the purge line to be positioned between the canister and the purge pump, and revolutions per minute (RPM) of the purge pump, and an opening amount and an opening timing of the purge valve are changed based on signals generated by the first pressure sensor and the second pressure sensor.

3. The active purge system of claim 1, wherein the valve controller induces a compression ratio to be less than an expansion ratio by delaying the closing timing of the intake valve during a compression stroke.

4. The active purge system of claim 1, wherein the compression ratio variation device is configured to increase the compression ratio by maximizing the top dead center of the piston when the engine is in operation in a low-medium load range, and decrease the compression ratio by minimizing the top dead center of the piston when the engine revolutions per minute (RPM) is in a high-speed range.

5. An active purge method using the active purge system of claim 1, comprising:
   calculating, by a controller, the amount of air injected in the cylinder before fuel injection;
   calculating, by the controller, a target purge amount to be processed by operation of the purge pump and the purge valve;
   operating, by the controller, the purge pump with a specific revolutions per minute (RPM) and the purge valve with a specific opening degree amount and at a specific opening/closing timing to satisfy the target purge amount; and
   calculating, by the controller, the amount of hydrocarbon that has reached the cylinder when the target purge amount is satisfied and calculating a fuel injection amount based on the amount of air injected in the cylinder and the amount of hydrocarbon.

6. The method of claim 5, wherein the amount of air injected in the cylinder is calculated from a signal generated from a sensor mounted on an intake manifold.

7. The method of claim 6, wherein the signal is substituted to a pre-prepared intake amount map to derive the amount of air.

8. The method of claim 5, wherein the amount of air injected in the cylinder is primarily calculated from the volume of the combustion chamber and volume of the cylinder changed based on the top dead center and the bottom dead center of the piston changed by the operation of the compression ratio variation device, and the primarily calculated amount of air is secondarily calculated by compensating for the primarily calculated amount of air based on the change in the opening degree amount of the throttle valve.

9. The method of claim 8, the amount of air injected in the cylinder is thirdly calculated by compensating for the secondarily calculated amount of air based on the amount of air estimated to flow into the cylinder and the move to the intake manifold by operation of the valve controller during the compression stroke.

10. The method of claim 8, wherein the amount of air injected in the cylinder is thirdly calculated by compensating for the secondarily calculated amount of air based on the amount of circulation gas estimated to circulate to the intake pipe when an exhaust gas recirculation (EGR) valve operates.

11. The method of claim 8, wherein the amount of air injected in the cylinder is thirdly calculated by compensating for the secondarily calculated amount of air based on an oversupply amount estimated to be oversupplied by operation of a compressor mounted on the intake pipe.

12. The method of claim 8, wherein the amount of air injected in the cylinder is thirdly calculated by compensating for the secondarily calculated amount of air based on the amount of vaporized gas estimated to be injected into the intake pipe by operations of the purge pump and the purge valve.

13. The method of claim 5, wherein the compression ratio variation device is configured to change the compression ratio by changing the top dead center or the bottom dead center of the piston based on engine RPM and a torque map.

14. The method of claim 13, further comprising correcting the fuel injection amount based on a compensation map determined in advance for each engine RPM.

15. The method of claim 14, wherein atmospheric temperature, cooling water temperature, the amount of oxygen contained in exhaust gas, the amount of hydrocarbon, and the fuel injection amount are stored as learning data,
   the atmospheric temperature, the cooling water temperature, the amount of oxygen contained in exhaust gas, and the amount of hydrocarbon that has reached the cylinder that are currently acquired in a driving state are substituted for the learning data to derive a fuel injection amount stored in the learning data, and the fuel injection amount corrected based on the compensation map is corrected based on the fuel injection amount derived from the learning data.

16. An active purge method using the active purge system of claim 1, comprising:

changing, by a controller, a compression ratio and changing the volume of the combustion chamber or the volume of the cylinder based on the top dead center and the bottom dead center of the piston changed by operation of the compression ratio variation device;

calculating, by the controller, the amount of air injected in the cylinder from the changed volume of the combustion chamber or the volume of the cylinder;

calculating, by the controller, a target purge amount to be processed by operations of the purge pump and the purge valve;

operating, by the controller, the purge pump with a specific revolutions per minute (RPM) and the purge valve with a specific opening degree amount and at a specific opening/closing timing to satisfy the target purge amount; and calculating, by the controller, the amount of hydrocarbon that has reached the cylinder with the changed volume and calculating a fuel injection amount based on the amount of air injected in the cylinder and the amount of hydrocarbon when the target purge amount is satisfied.

17. The method of claim 16, further comprising correcting the fuel injection amount based on a compensation map determined in advance for each engine RPM.

18. The method of claim 16, wherein the amount of air injected in the cylinder is compensated based on the amount of air estimated to flow into the cylinder and the move to the intake manifold by operation of the valve controller during the compression stroke, or is compensated based on an oversupply amount estimated to be oversupplied by operation of the compressor mounted on the intake pipe.

19. The method of claim 16, wherein the compression ratio variation device is configured to change the compression ratio by changing the top dead center or the bottom dead center of the piston based on engine RPM and a torque map.

* * * * *